US009762678B2

(12) United States Patent
Matthews et al.

(10) Patent No.: US 9,762,678 B2
(45) Date of Patent: Sep. 12, 2017

(54) METHOD, APPARATUS AND COMPUTER PROGRAM FOR MODIFYING AN ENDPOINT REFERENCE REPRESENTING A WEB SERVICE ENDPOINT

(75) Inventors: Daniel J. Matthews, Hampshire (GB); Sara L. Mitchell, Hampshire (GB); Kathryn S. Warr, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 12/515,681

(22) PCT Filed: Nov. 8, 2007

(86) PCT No.: PCT/EP2007/062048
§ 371 (c)(1),
(2), (4) Date: May 20, 2009

(87) PCT Pub. No.: WO2008/064981
PCT Pub. Date: Jun. 5, 2008

(65) Prior Publication Data
US 2010/0049833 A1    Feb. 25, 2010

(30) Foreign Application Priority Data

Nov. 30, 2006   (EP) ........................................ 0623904

(51) Int. Cl.
*G06F 15/16*   (2006.01)
*H04L 29/08*   (2006.01)

(52) U.S. Cl.
CPC .............. *H04L 67/16* (2013.01); *H04L 67/02* (2013.01)

(58) Field of Classification Search
CPC ................................ H04L 67/16; H04L 67/02
(Continued)

(56) References Cited

U.S. PATENT DOCUMENTS 6,141,325 A * 10/2000 Gerstel .................. H04L 45/04
370/238
7,636,939 B2 * 12/2009 Kaler ...................... H04L 63/16
380/255
(Continued)

FOREIGN PATENT DOCUMENTS

GB    WO 2004/084522 A1 *  8/2004  ............. H04L 29/08
JP    2004133839           4/2004
WO    2005006219 A2        1/2005

OTHER PUBLICATIONS

Berbner et al. An Architecture for a QoS driven composition of Web Service based Workflows. Networking and Electronic Commerce Research Conference (NAEC 2005), Oct. 6-9, 2005, Riva Del Garda, Italy. pp. 1-10.*

(Continued)

*Primary Examiner* — John Macilwinen
(74) *Attorney, Agent, or Firm* — Steven M. Greenberg, Esq.; CRGO Law

(57) ABSTRACT

WS-Addressing EndpointReferences represent Web service endpoints and are propagated in the SOAP Envelope as part of Web service interactions.

There is disclosed a method, apparatus and computer program for resolving (or modifying) aspects of the EndpointReference at the time of its propagation based on the EndpointReference recipient. Different recipients will potentially receive differing EndpointReferences. Aspects of the EndpointReference are re-resolved as the SOAP XML representing the EndpointReference is generated for the EndpointReference's propagation. For example, the location of the recipient might make a difference to the address propagated—if the recipient is outside a firewall, it may be appropriate to provide the recipient with the address of the firewall itself and to allow the firewall to re-route any request from the data to the web service endpoint. Alterna- (Continued)

tively, metadata contained within the EndpointReference might vary depending on the recipient—policy metadata contained within the EndpointReference might specify more stringent security requirements depending on the recipient.

12 Claims, 7 Drawing Sheets

(58) Field of Classification Search
USPC .......................................................... 709/219
See application file for complete search history.

(56) References Cited

U.S. PATENT DOCUMENTS

| | | | |
|---|---|---|---|
| 7,650,376 B1* | 1/2010 | Blumenau | ..................... 709/203 |
| 7,716,279 B2* | 5/2010 | Savchenko et al. | .......... 709/203 |
| 2002/0169891 A1 | 11/2002 | Sasaki et al. | |
| 2003/0135646 A1 | 7/2003 | Inoue et al. | |
| 2004/0117199 A1* | 6/2004 | Fremantle et al. | ................ 705/1 |
| 2004/0215707 A1* | 10/2004 | Fujita et al. | ................... 709/201 |
| 2005/0234923 A1* | 10/2005 | Betts | .................. G06F 17/30887 |
| 2006/0265396 A1* | 11/2006 | Raman et al. | ................... 707/10 |
| 2007/0005777 A1 | 1/2007 | Fremantle et al. | |

OTHER PUBLICATIONS

Cubera et al. "Web Services Addressing". ResearchGate. Jan. 2004. pp. 1-22.*
Foster et al. "Modeling Stateful Resources with Web Services". Version 1.1. Mar. 5, 2004. pp. 1-24.*
Ferguson et al. "Secure, Reliable, Transacted Web Services: Architecture and Composition". Nov. 2003. pp. 1-20.*
"Serialization". Retrieved from Wikipedia.com on Nov. 22, 2016. pp. 1-8.*
"Serialization (C#)". Visual Studio 2015. https://msdn.microsoft.com/en-us/library/mt656716.aspx. Retrieved Nov. 22, 2016. pp. 1-3.*

* cited by examiner

METHOD, APPARATUS AND COMPUTER PROGRAM FOR MODIFYING AN ENDPOINT REFERENCE REPRESENTING A WEB SERVICE ENDPOINT

CROSS-REFERENCE TO RELATED APPLICATIONS

This application is a Submission Under 35 U.S.C. §371 for U.S. National Stage Patent Application of International Application Number PCT/EP2007/062048, filed Nov. 8, 2007, and entitled A METHOD, APPARATUS AND COMPUTER PROGRAM FOR MODIFYING AN ENDPOINT REFERENCE REPRESENTING A WEB SERVICE ENDPOINT, which is related to and claims priority to European Patent Application Serial Number EP06239040.0, filed Nov. 30, 2006, the entirety of which are incorporated herein by reference.

FIELD OF THE INVENTION

The invention relates to a data processing system and more particularly to the addressing of endpoints within such a data processing system.

BACKGROUND OF THE INVENTION

The Internet is based on a client server model and comprises a plurality of web servers which are accessible by a plurality of clients over a communication network.

The notion of access to web services via the Internet is becoming popular and a number of standards are developing.

FIG. 1 shows a computer network 5 comprising a host computer system, web server 50, connected to client 10 over communication network (e.g. the Internet) 60. The web server 50 hosts access to a web service 30 which provides a collection of functions packaged as a single entity and published to the network for use by other programs, thus supporting interoperable machine-to-machine interaction over the network. The web service has an interface 40 that is described in a machine processable format, such as the Web Services Definition Language (WSDL). Other systems interact with the web service in a manner prescribed by its interface using messages. These messages are typically conveyed using HTTP and normally comprise extensible Markup Language (XML) in conjunction with other web-related standards.

The WS-Addressing specification is the result of a collaborative effort driven by the W3C (World Wide Web Consortium). WS-Addressing is concerned with the targeting of web service messages appropriately.

WS-Addressing introduces the notion of EndpointReferences (EPRs) which convey the information required to address a web service endpoint (a web service port with some possible application data associated) in a standard XML format.

There are a number of properties in an EPR such as its address (which is the URI of the endpoint that the EPR represents), and metadata about the endpoint (such as the capabilities of the endpoint). Some of these properties (such as the address URI) may be generated based on the endpoint's deployment information or they may be known to the application generating the EPR. EPRs are propagated in a SOAP Envelope as part of Web service interactions. The recipient of an EPR in a Web service interaction might use that EPR in order to target the Web service.

SUMMARY OF THE INVENTION

According to a first aspect, there is provided a method for modifying an EPR representing a web service endpoint, the method comprising: modifying the EPR in dependence upon at least one attribute of the recipient to which the EPR is to be propagated; and propagating the modified EPR to the client.

The EPR is preferably modified at the point of its propagation to a recipient

The term 'recipient' is intended to encompass both a recipient client and a recipient web service.

One such attribute may be the location of the recipient and this may result in modification of the address element of the EPR.

In such an embodiment, information is acquired about the recipient to which the EPR is to be propagated and one or more rules are accessed to determine how the acquired information affects the EPR to be propagated.

An example of rules which may affect the EPR that is ultimately propagated to the EPR recipient is a requirement that a recipient outside of a firewall (behind which the endpoint sits) accesses the target endpoint via that firewall.

In one embodiment, the EPR is modified based on a service level agreement (SLA) between the recipient and the endpoint represented by the EPR.

For example, an EPR recipient may be classified as a 'gold service' business partner. In this example, the EPR might be modified during its propagation to that recipient such that it addresses a server guaranteeing a faster turn-around time.

The relative locations of the recipient and the endpoint may also result in modification of the EPR. System topology data may be accessed in order to make a judgement with respect to relative location.

An EPR may comprise metadata. This may be modified in dependence upon an attribute of the intended recipient. For example, it may be required that a certain recipient always access the target endpoint with a specific level of security (security policy). The metadata can be modified to specify such a security policy.

According to another aspect, there is provided an apparatus for modifying an EPR representing a web service endpoint, the apparatus comprising: means for modifying the EPR in dependence upon at least one attribute of the recipient to which the EPR is to be propagated; and means for propagating the modified EPR to the recipient.

The invention may be implemented in computer software.

BRIEF DESCRIPTION OF THE DRAWINGS

A preferred embodiment of the present invention will now be described, by way of example only, and with reference to the following drawings.

DETAILED DESCRIPTION

As discussed above, the WS-Addressing specification is about ensuring the correct targeting of web service messages and with this in mind introduces the concept of an Endpoint Reference (EPR).

Figure 1:
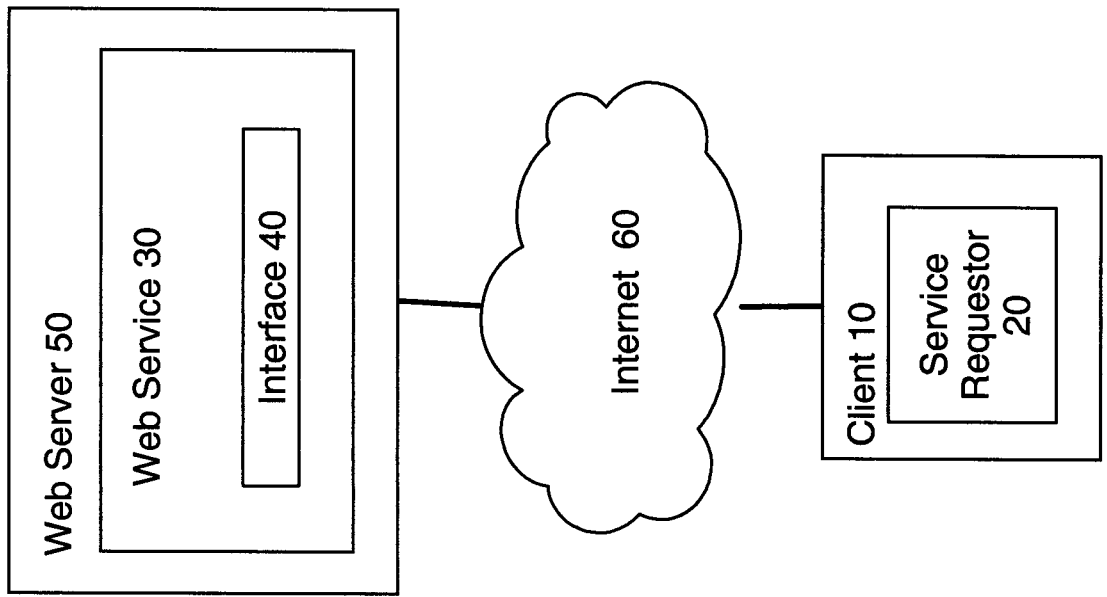
FIG. 1 is a component diagram of a web services environment.
Figure 2A:
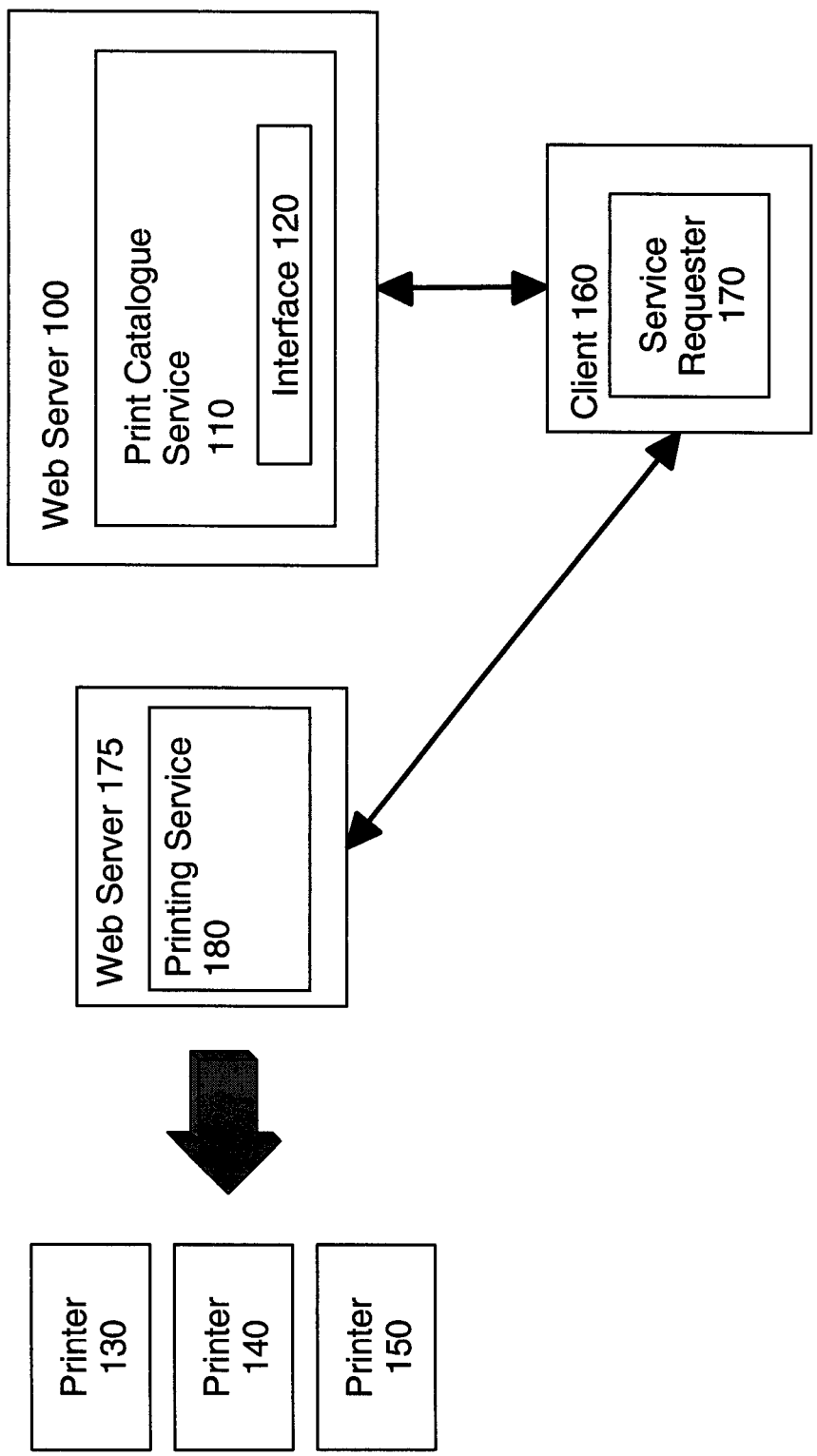
FIGS. 2a and 2b illustrate a print web service example in accordance with a preferred embodiment of the present invention.
Figure 2B:
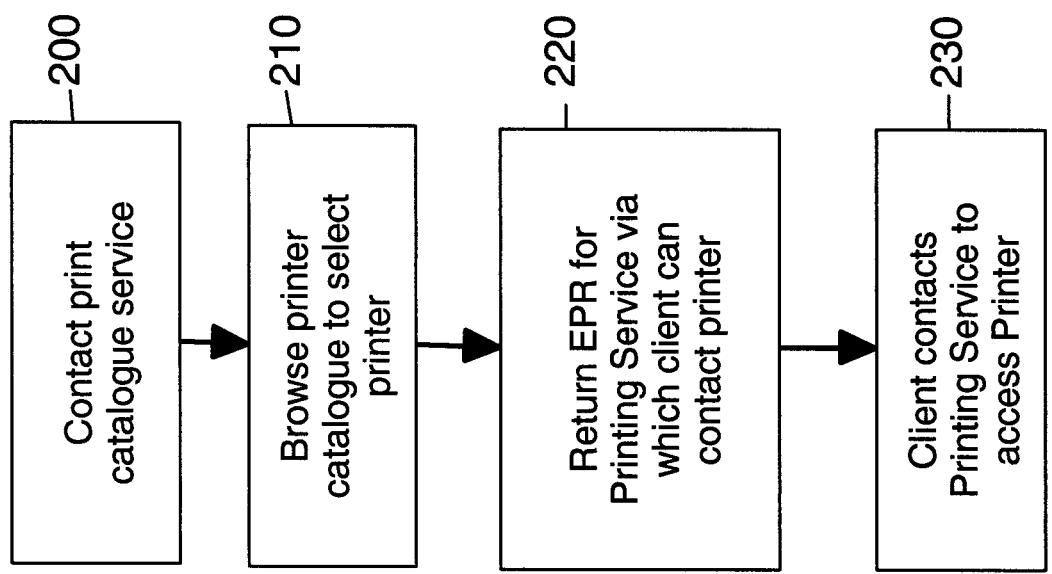

An exemplary use of an EPR will be described with reference to FIGS. 2a and 2b (which should be read in conjunction with one another).

A client 160 uses a service requester 170 (e.g. a print application) to contact print catalogue service 110, hosted by web server 100 at step 200. Print catalogue service 110 is accessible via interface 120. Service requester 170 browses the provided printer catalogue to select a printer at step 210. The web service returns an endpoint reference (EPR) at step 220 to the printing service 180 via which the selected printer 130, 140 or 150 may be accessed. In this example, the EPR returned is to a web service 180 hosted by a different web server 175. However in another example, the EPR may be created on and refer to the same web server.

Thus as exemplified, EPRs are typically created and then propagated to clients who might want to access the referenced endpoint. Once the EPR is created, it is deemed to represent the endpoint and its contents are not changed.

In certain situations, it is not appropriate to provide all requesting clients with identical EPRs for the requested web service endpoint. Instead it might be preferable for the EPR to depend on to whom it is being propagated to. For example, if the above EPR is being passed to a client outside a firewall, it may be appropriate to hide the actual address of the web server on which the web service endpoint resides. It also might be appropriate to vary the EPR that is returned dependent upon the client to which the EPR is being propagated.

A solution is therefore proposed which modifies, for example, the address part of the EPR based on the target to which the EPR is to be propagated. Such a modification to the EPR preferably takes place at the same time as the EPR is being serialised for propagation.

The creation and modification of an EPR will now be described with reference to FIGS. 3, 4a, 4b and 4c.

Figure 3:
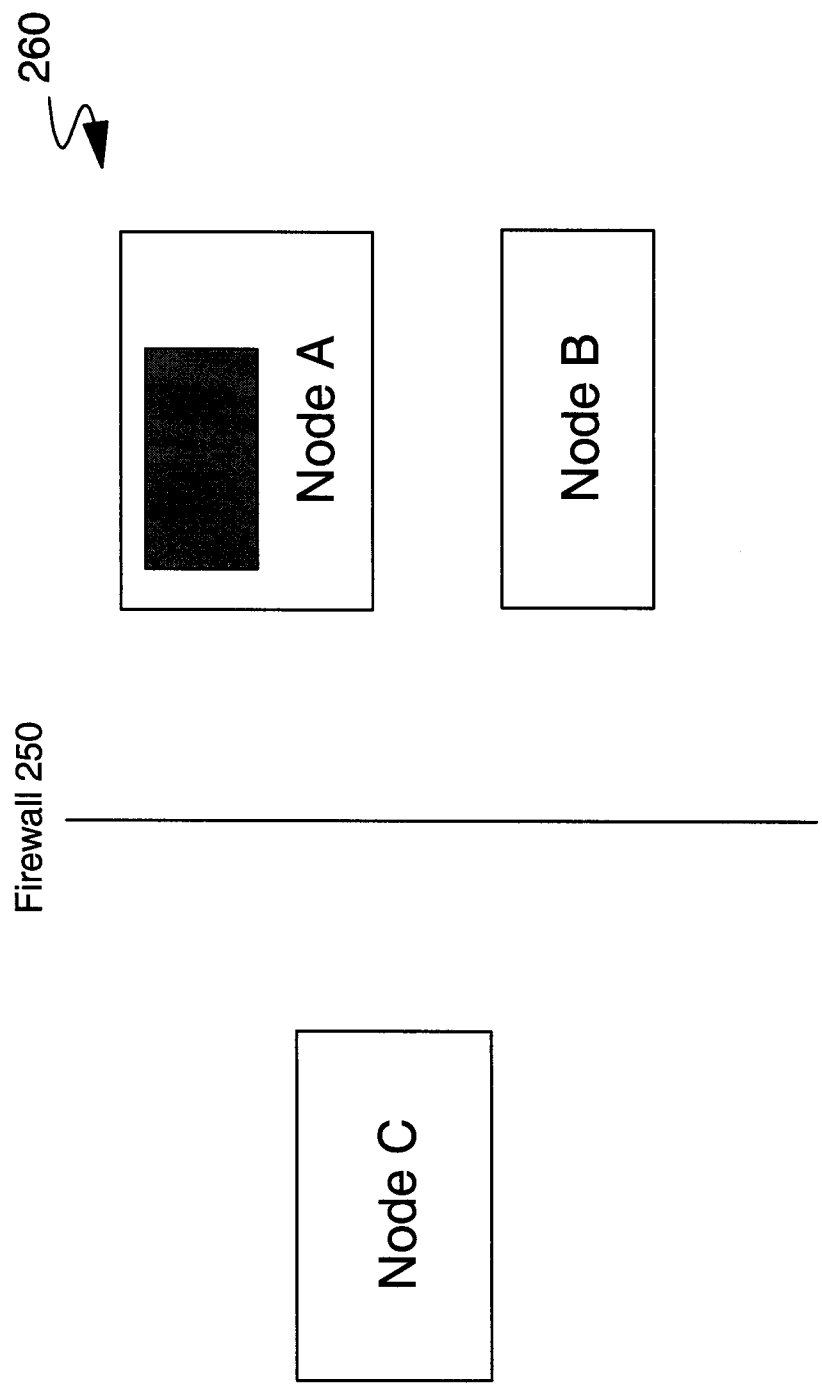
FIGS. 3, 4a, 4b and 4c illustrate the components and processing of the present invention in accordance with a preferred embodiment.
Figure 4A:
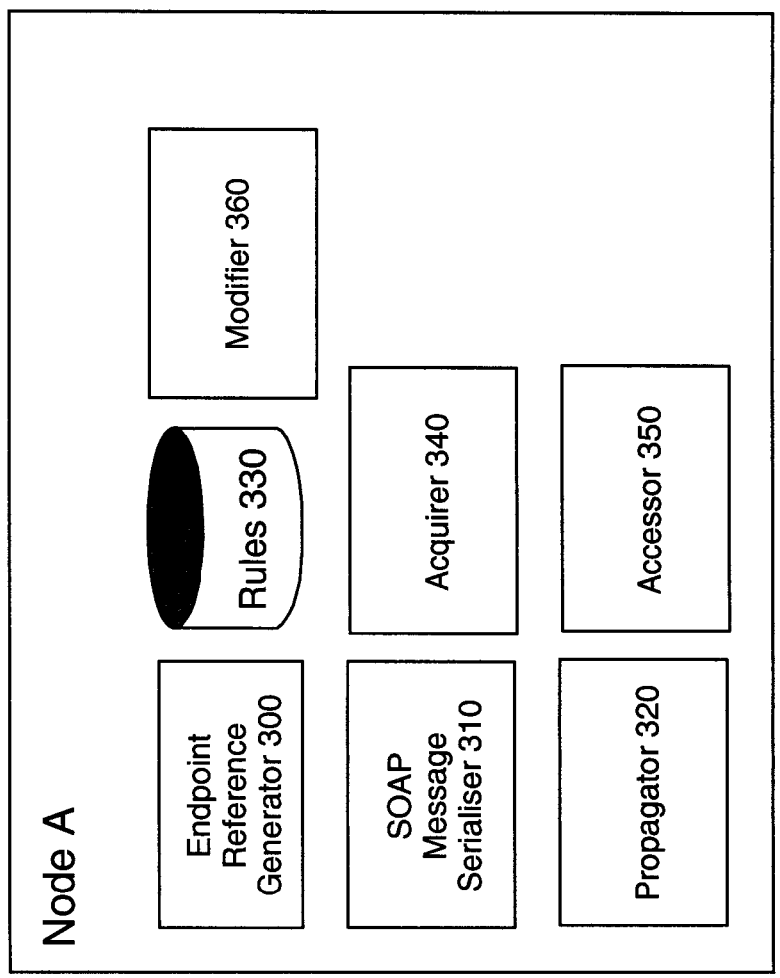
Figure 4B:
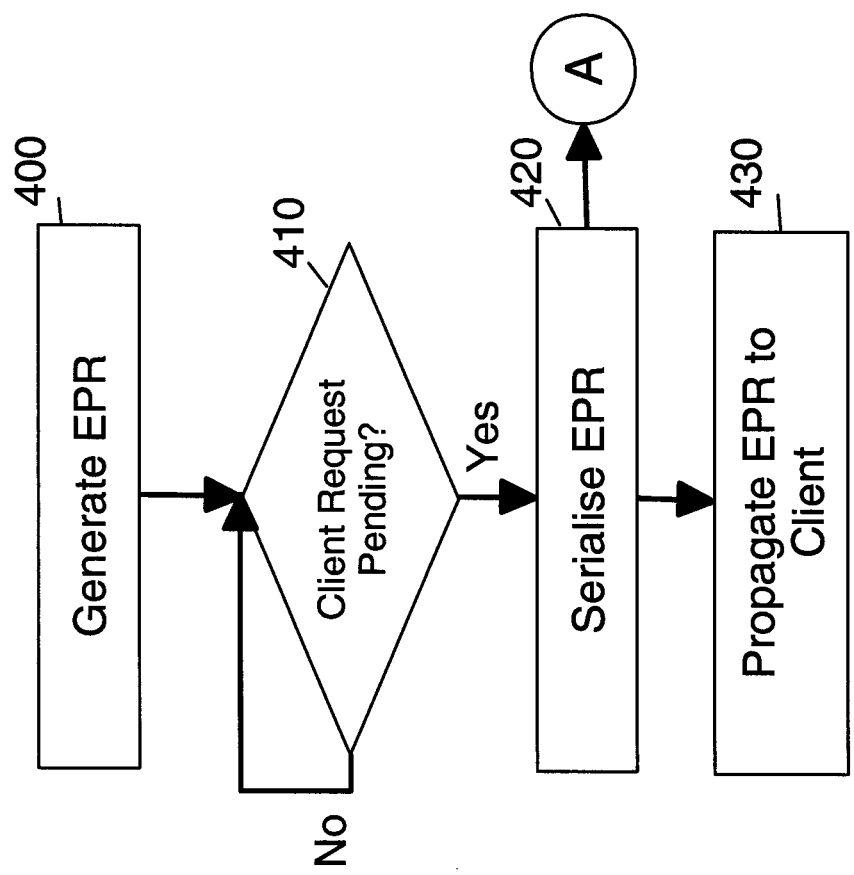

As shown in FIG. 3, node A has an endpoint instance 260 (representing a web service endpoint). An EPR for that endpoint instance is generated by EPR Generator 300 on node A at step 400 (FIGS. 4a, 4b). The generated EPR may be represented as:

```
<wsa:EndpointReference>
   <wsa:Address>targetServiceURI</wsa:Address>
      :
</wsa:EndpointReference>
``` where the wsa prefix <wsa> might equate to www.w3.org/2005/08/addressing and
where targetServiceURI is the URI address of the target service on node A.

Prior to propagation of the EPR to a client, the EPR is serialised into a SOAP message by SOAP Serialiser 310 at steps 410, 420 (FIGS. 4a, 4b). The SOAP message comprises a header (hdr) and a body. The message, including the EPR, is then propagated to the client (step 430) using propagator 320. The EPR may be propagated in the header (for example in the WS-Addressing [replyTo] header) as shown in listing 1:

```
<S:Envelope xmlns:S="http://www.w3.org/2003/05/soap-envelope"
            xmlns:wsa="http://www.w3.org/2005/08/addressing">
   <S:Header>
      :
      <wsa:ReplyTo>
         <wsa:Address>http://nodeA/business/client1</wsa:Address>
      </wsa:ReplyTo>
      :
   </S:Header>
   <S:Body>
      ....
   </S:Body>
</S:Envelope>
```

Alternatively the EPR may be propagated in the soap body as shown in listing 2:

```
<S:Envelope xmlns:S="http://www.w3.org/2003/05/soap-envelope"
            xmlns:wsa="http://www.w3.org/2005/08/addressing">
   <S:Header>
      :
      :
   </S:Header>
   <S:Body>
      :
      <wsa:EndpointReference>
         <wsa:Address>http://nodeA/business/client1</wsa:Address>
      </wsa:EndpointReference>
      :
   </S:Body>
</S:Envelope>
```

Figure 4C:
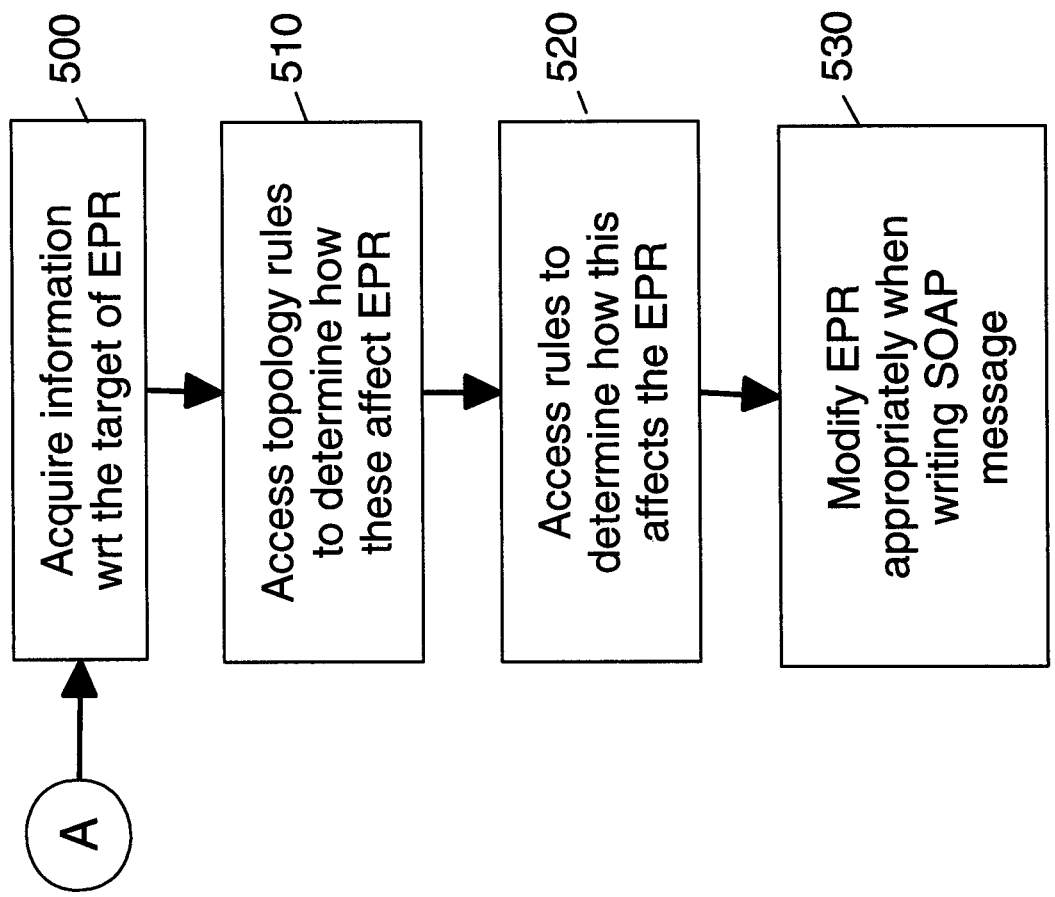

As shown in FIG. 4c, at the point of serialisation, information is acquired about the destination's address to which the EPR is to be targeted (step 500) using acquirer 340. In the case of a request message, the address of the destination to which the EPR is to be targeted may come from the wsa:to (SOAP destination) field. In the case of a synchronous response message, the destination of the response destination address might be established from its corresponding request message's wsa:From EPR, or from some other protocol specific information.

Accessor component 350 then accesses rules 330 to determine how the destination's address effects the EPR to be propagated (step 510, 520). The rules 330 define the address that should be used by the destination in order to target the endpoint. For example:

The rules 330 might list all the known nodes within a firewall (internal IP addresses) and infer that EPRs propagated to nodes not in this list should have their address re-written to be the firewall's address.

OR

The rules might utilise a topology mapping table representing the system topology in order to re-write the EPR's address based on the destination to which it is being propagated and its relative position in the topology to the endpoint's address.

Modifier component 360 then rewrites the address of the EPR based on the destination to which the EPR will be propagated to (and therefore targeted from at a later point in time) (step 530).

With respect to the example of FIG. 3, if the EPR is exported (as part of a SOAP message) to Node B, the rules 330 may not place any requirement upon Node A to modify the EPR prior to export as it is within the firewall 250. Node B, upon receipt of the unmodified EPR, will therefore be able to reference node A directly.

Node C is however outside firewall 250 (i.e. not recognised as a node within the firewall bounds) and rules 330 may specify that node C should not therefore be able to access node A directly. Thus during serialisation of a SOAP message for node C, the EPR address generated when the endpoint instance was created is overwritten with the firewall's address. The firewall then routes any messages from the client to the appropriate node.

Note that this EPR rewrite can't be done in the firewall because the EPR might be propagated directly to node C (i.e. avoiding the firewall).

As mentioned above, it should be appreciated that modification of the EPR does not have to depend on location of the EPR recipient. One or more other attributes of the recipient may be taken into account. The rules (exemplified earlier) may utilise some grouping of IP addresses based on some attribute other than topology—for example, EPR's might have their addresses re-written based on the level of service agreement of the destination to which they are being propagated. For instance, the client may be classified as a 'gold-service' business partner and thus an EPR might be modified such that the EPR propagated to that client points to a server guaranteeing a particular turn around time. In addition, aspects of the EPR other than address such as Metadata may be modified.

Thus, to summarise:

WS-Addressing EndpointReferences represent Web service endpoints and are propagated in the SOAP Envelope as part of Web service interactions.

There is disclosed a method, apparatus and computer program for resolving (or modifying) aspects of the EndpointReference at the time of its propagation based on the EndpointReference recipient. Different recipients will potentially receive differing EndpointReferences. Aspects of the EndpointReference are re-resolved as the SOAP XML representing the EndpointReference is generated for the EndpointReference's propagation. For example, the location of the client might make a difference to the address propagated—if the client is outside a firewall, it may be appropriate to provide the client with the address of the firewall itself and to allow the firewall to re-route any request from the data to the web service endpoint. Alternatively, metadata contained within the EndpointReference might vary depending on the recipient—policy metadata contained within the EndpointReference might specify more stringent security requirements depending on the recipient.

The invention claimed is:

1. A method for modifying an endpoint reference (EPR) representing a web service endpoint, the method comprising:
   receiving over a computer communications network a selection of a web service endpoint in a web service hosted by a web server;
   determining an EPR for the selected web service endpoint, the EPR having an initially specified address on which the web service endpoint resides;
   serializing the EPR for propagation to a client and during serialization of the EPR, consulting a set of rules listing all known internal addresses behind a firewall and modifying the initially specified address of the EPR to a different address that includes an address of the firewall only if a destination address of the recipient is not present in the set of rules; and
   propagating the serialized modified EPR from the web server to a recipient over the computer communications network.

2. The method of claim 1, wherein the initially specified address of the EPR is modified to a different address so as to hide the initially specified address on which the web service endpoint resides.

3. The method of claim 1, wherein the initially specified address of the EPR is modified to a different address dependent upon the recipient.

4. The method of claim 1, wherein during serialization, a set of rules is consulted that includes a mapping table representing a system topology and, the EPR is modified based upon a destination to which the EPR is to be propagated and the relative position in the topology of the destination in respect to an address of the web service endpoint.

5. A computer system for modifying an endpoint reference (EPR) representing a web service endpoint, the computer system comprising:
   a computer hardware processor configured to perform:
   receiving over a computer communications network a selection of a web service endpoint in a web service hosted by a web server;
   determining an EPR for the selected web service endpoint, the EPR having an initially specified address on which the web service endpoint resides;
   serializing the EPR for propagation to a client and during serialization of the EPR, consulting a set of rules listing all known internal addresses behind a firewall and modifying the initially specified address of the EPR to a different address that includes an address of the firewall only if a destination address of the recipient is not present in the set of rules; and
   propagating the serialized modified EPR from the web server to a recipient over the computer communications network.

6. The system of claim 5, wherein the initially specified address of the EPR is modified to a different address so as to hide the initially specified address on which the web service endpoint resides.

7. The system of claim 5, wherein the initially specified address of the EPR is modified to a different address dependent upon the recipient.

8. The system of claim 5, wherein during serialization, a set of rules is consulted that includes a mapping table representing a system topology and, the EPR is modified based upon a destination to which the EPR is to be propagated and the relative position in the topology of the destination in respect to an address of the web service endpoint.

9. A computer program product comprising a computer usable storage device embodying computer usable program code for modifying an endpoint reference (EPR) representing a web service endpoint the computer program product comprising:
   computer usable program code for receiving over a computer communications network a selection of a web service endpoint in a web service hosted by a web server;
   computer usable program code for determining an EPR for the selected web service endpoint, the EPR having an initially specified address on which the web service endpoint resides;
   computer usable program code for serializing the EPR for propagation to a client and during serialization of the EPR, consulting a set of rules listing all known internal addresses behind a firewall and modifying the initially specified address of the EPR to a different address that includes an address of the firewall only if a destination address of the recipient is not present in the set of rules; and computer usable program code for propagating the serialized modified EPR from the web server to a recipient over the computer communications network.

10. The computer program product of claim 9, wherein the initially specified address of the EPR is modified to a different address so as to hide the initially specified address on which the web service endpoint resides.

11. The computer program product of claim 9, wherein the initially specified address of the EPR is modified to a different address dependent upon the recipient.

12. The computer program product of claim 9, wherein during serialization, a set of rules is consulted that includes a mapping table representing a system topology and, the EPR is modified based upon a destination to which the EPR is to be propagated and the relative position in the topology of the destination in respect to an address of the web service endpoint.

* * * * *